United States Patent
Khalid et al.

(10) Patent No.: US 7,869,446 B2
(45) Date of Patent: Jan. 11, 2011

(54) OPTIMIZED DYNAMIC MULTIPOINT VIRTUAL PRIVATE NETWORK OVER IPV6 NETWORK

(75) Inventors: Mohamed Khalid, San Jose, CA (US);
Rajiv Asati, Morrisville, NC (US);
Ciprian Popoviciu, Raleigh, NC (US);
Aamer Akhter, Carey, NC (US);
Manikchand Roopchand Bafna,
Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 12/246,432

(22) Filed: Oct. 6, 2008

(65) Prior Publication Data

US 2010/0085977 A1    Apr. 8, 2010

(51) Int. Cl.
*H04L 12/28* (2006.01)
(52) U.S. Cl. .................................... 370/400; 370/231
(58) Field of Classification Search ................. None
See application file for complete search history.

(56) References Cited

U.S. PATENT DOCUMENTS

| | | | |
|---|---|---|---|
| 6,917,618 B2 | 7/2005 | Thubert et al. | |
| 7,443,880 B2 | 10/2008 | Wetterwald et al. | |
| 7,562,384 B1 * | 7/2009 | Huang | 726/5 |
| 7,609,689 B1 | 10/2009 | Desanti et al. | |
| 7,609,691 B2 | 10/2009 | Hain et al. | |
| 7,680,943 B2 * | 3/2010 | Conta et al. | 709/230 |
| 2006/0062248 A1 * | 3/2006 | Huang et al. | 370/466 |
| 2006/0209831 A1 * | 9/2006 | Shepherd et al. | 370/392 |
| 2007/0109966 A1 * | 5/2007 | Lee et al. | 370/231 |
| 2009/0248800 A1 * | 10/2009 | Chu et al. | 709/204 |

OTHER PUBLICATIONS

Suthar, Tejas, "IPV6—A Service Provider View in Advancing MPLS Networks," TELUS Communications Inc., The Internet Protocol Journal, vol. 8, No. 2, Jun. 2005, pp. 1-12.
"IPv6 Tunnel Through and IPv4 Network," Cisco Systems, Inc., Aug. 10, 2006, pp. 1-15.
"IPv6 Deployment Strategies," Cisco Systems, Inc., Dec. 2002, pp. 1-28.

* cited by examiner

*Primary Examiner*—Robert W Wilson
(74) *Attorney, Agent, or Firm*—Cesari and McKenna, LLP; Michael R. Reinemann (57) ABSTRACT

Method and apparatus including registering a first spoke router with a hub router, forwarding an Internet Protocol version Four (IPv4) data packet from the first spoke router to a second spoke router over an Internet Protocol version Six (IPv6) multipoint tunnel via the hub router, transmitting a binding information associated with the first spoke router from the hub router to the second spoke router, and establishing a direct communication path by the second spoke router with the first spoke router based on the received binding information are provided.

20 Claims, 5 Drawing Sheets

OPTIMIZED DYNAMIC MULTIPOINT VIRTUAL PRIVATE NETWORK OVER IPV6 NETWORK

TECHNICAL FIELD

The present disclosure relates to network routing protocols. More specifically, the present disclosure relates to methods and system for providing a framework for optimized connectivity of an IPv4 Dynamic Multipoint Virtual Private Network over an IPv6 Internet Protocol/Multiprotocol Label Switching cloud.

BACKGROUND

Today's Dynamic Multipoint Virtual Private Networks (DMVPN) are most commonly deployed over an Internet Protocol/Multiprotocol Label Switching (IP/MPLS) cloud. The IP/MPLS cloud is usually an Internet Protocol version Four (IPv4) based network and the DMVPN sites usually connect to the cloud using IPv4 technology.

Currently, Internet Protocol version Six (IPv6) deployment is spreading around the world. IPv6 is designated as the successor to IPv4, the current standard Internet Protocol used for general internet use. IPv6 offers a number of improvements over IPv4, the most noted of which is the upgrade from the 32-bit address length of IPv4 to a 128-bit length address. This increases the number of total addresses available for networked devices from $2^{32}$ (approximately 4.3 billion) addresses available with the 32-bit address length of IPv4, to $2^{128}$ (approximately $3.4\times10^{38}$) addresses available with the 128-bit address length of IPv6. This increase in the number of total addresses allows for IPv6 nodes to have as many globally unique addresses as needed, thus eliminating the need for conservation techniques such as network address translation.

With the global deployment of IPv6 spreading rapidly, DMVPN customers will soon have to connect over an IPv6 cloud, instead of the customary IPv4 cloud. This poses a problem for the customers using a DMVPN based on IPv4 technology who cannot afford to upgrade to IPv6 simply because the Service Provider provides IPv6 connectivity.

OVERVIEW

A method in particular embodiments includes establishing an Internet Protocol version Six (IPv6) multipoint tunnel with an IPv6 address as a tunnel source address and an Internet Protocol version Four (IPv4) as a tunnel address, between a first spoke router and a hub router, transmitting a binding information associated with the first spoke router by the hub router to the second spoke router, forwarding an IPv4 data packet from the first spoke router to the second spoke router over the IPv6 multipoint tunnel via the hub router, and establishing a direct communication path between the second spoke router and the first spoke router using the binding information associated with the first spoke router.

A method in particular embodiments includes registering a first spoke router with a hub router, forwarding an Internet Protocol version Four (IPv4) data packet from the first spoke router to a second spoke router over an Internet Protocol version Six (IPv6) multipoint tunnel via the hub router, transmitting a binding information associated with the first spoke router from the hub router to the second spoke router, and establishing a direct communication path by the second spoke router with the first spoke router based on the received binding information.

DESCRIPTION OF EXAMPLE EMBODIMENTS

Figure 1:
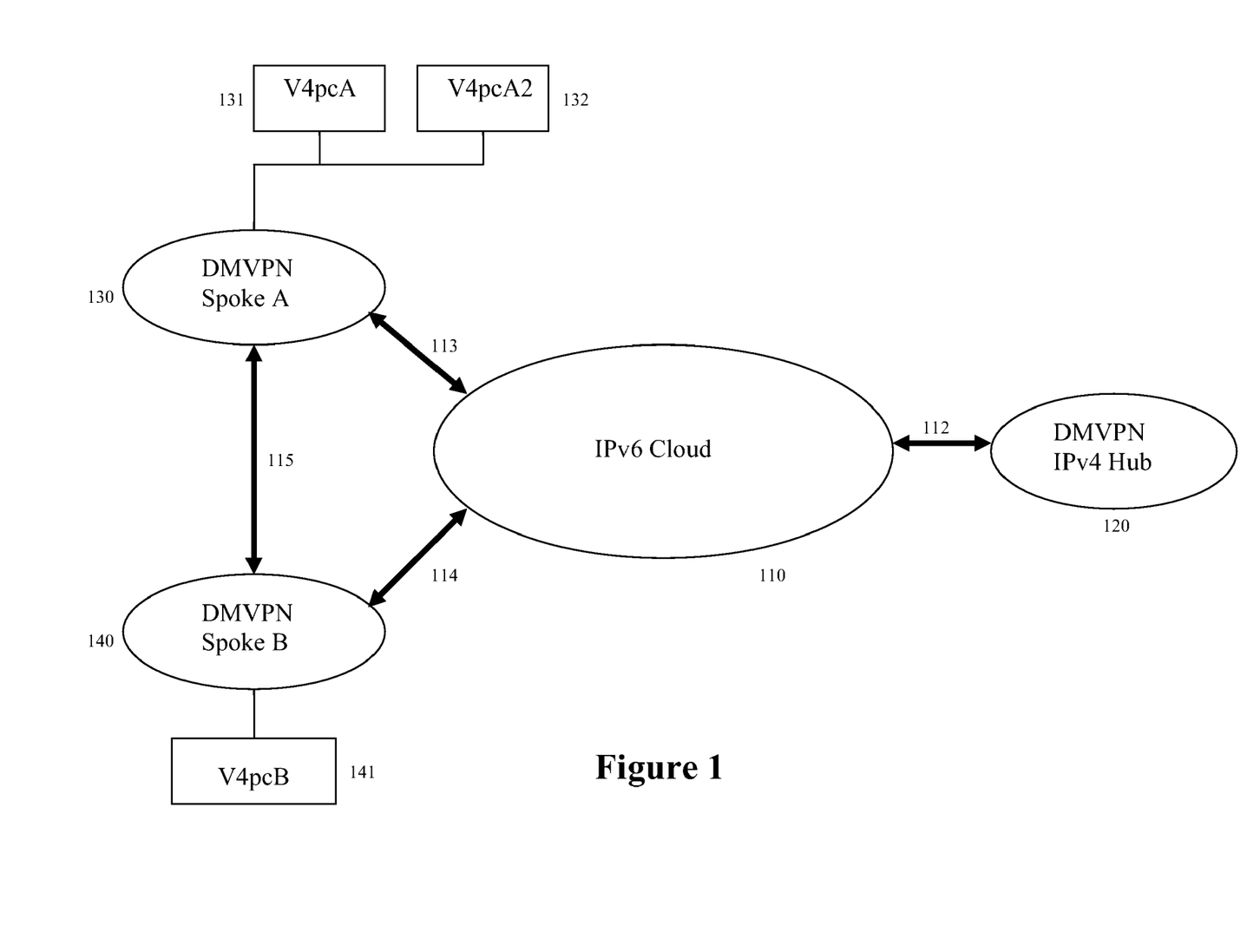
FIG. 1 is a block diagram of a Dynamic Multipoint Virtual Private Network (DMVPN) running on IPv4 technology over an IPv6 cloud for practicing one or more embodiments of the present disclosure.

FIG. 1 is a block diagram of a Dynamic Multipoint Virtual Private Network (DMVPN) running on IPv4 technology over an IPv6 cloud for practicing one or more embodiments of the present disclosure. Referring to FIG. 1, a DMVPN in particular embodiments may include an internet protocol/multi protocol label switching (IP/MPLS) cloud 110, one or more hub sites 120, and two or more spokes sites 130, 140. Each site may include one or more network entities such as, for example, routers or network devices. In particular embodiments, the IP/MPLS cloud 110 may provide IPv6 enabled communication path for IPv6 multipoint tunnels 112 to the network entities such as, for example, routers in hub site 120, multipoint tunnels 113, 114 to the spokes 130, 140, and tunnels 115 connecting directly between spokes 130, 140. Connected to each spoke router 130, 140, is one or more computer terminals 131-132, 141 respectively. In this manner, in particular embodiments, each site may include one or more routers, for example, and one or more computer terminals connected to the one or more routers, where each, multipoint tunnel may be established between two or more routers.

Referring again to FIG. 1, in particular embodiments, data packets may be transmitted either between the hub site 120, and the spokes 130, 140, or between spoke A 130 and spoke B 140, over the IPv6 cloud 110, via the multipoint tunnels 112-115. Each multipoint tunnel in particular embodiments may be defined to include an IPv4 address as the tunnel IP address, and an IPv6 address as the tunnel source IP address. In particular embodiments, the tunnel source IPv6 address may be used as the source IPv6 address of the IPv6 packet transmitted towards the Hub or Spoke site via the IPv6 cloud. In particular embodiments, the multipoint tunnel may employ generic routing encapsulation (GRE). In particular embodiments, a border gateway routing protocol (BGP) may be used to exchange IPv4 prefix reachability information (for prefixes such as ones belonging to computer terminals 131-132, 140 etc.) between hub site 120 and each spoke site 130, 140.

While BGP routing protocol is described above, in particular embodiments, other routing protocols may be implemented. Referring to FIG. 1, in particular embodiments, spoke A 130 may initiate connection by sending a null packet over the IPv6 Cloud 110 through the multipoint tunnels 112, 113 toward the hub site 120. Included in the null packet may be an extension header, which may be placed after the Encapsulating Security Payload (ESP) header, if IPSec cryptography is desired, to ensure the confidentiality of the information. The use of a group cryptography key in particular embodiments, allows for connection with immediate encryption and decryption without the need for an internet key exchange (IKE), which in turn may increase the overall performance of the framework. Another option for encryption may include a public key infrastructure (PKI)/pre-shared key (PSK) approach which uses unique pair wise keys between peers. In particular embodiments, with the group encryption key, before sending the packets including the new extension headers, encryption/decryption keys may be sent between the spoke and hub sites.

In particular embodiments, any number of applicable encryption/decryption solutions may be implemented. In particular embodiments, the extension header may encode spoke A's 130 IPv4 tunnel address and spoke A's 130 IPv6 address, which is used for reachability over the IPv6 network. The hub site 120, after receiving this extension header may acknowledge the information from Spoke A 130 and respond with another extension header including the hub site's 120 IPv4 tunnel address and the hub site's 120 IPv6 address. In particular embodiments, the extension header information may be used to update the binding table of the IPv4 addresses with the corresponding IPv6 addresses of the hub site 120 and the spoke A 130.

Still referring to FIG. 1, in particular embodiments, in the case where computer terminal 131 connected to spoke A 130 needs to send traffic to computer terminal 141 connected to spoke B 140, the initial communication may be transmitted indirectly through the hub site 120. In particular embodiments, data may be forwarded from computer terminal 131 to spoke A 130 over the IPv4 connection. Spoke A 130 may initiate connection by transmitting a null packet over the IPv6 cloud 110 through the multipoint tunnels 112, 113 toward the hub site 120. Included in this null packet may be an extension header, which may be placed after the Encapsulating Security Payload (ESP) header, if employing IPSec cryptography to ensure a predetermined level of security or confidentiality of the transmitted data. In particular embodiments, the extension header may encode spoke A's 130 IPv4 tunnel address and spoke A's 130 IPv6 address, which is used for reachability over the IPv6 network.

The hub site 120, after receiving this extension header, in particular embodiments, acknowledges the information from spoke A 130 and responds with another extension header including the hub site's 120 IPv4 tunnel address and the hub site's 120 IPv6 address. The extension header information may be used to update the binding table of the IPv4 addresses with the corresponding IPv6 addresses of the hub site 120 and the spoke A 130. Upon receiving the response extension header from the hub site 120, spoke A 130 may update its own binding table before sending the first data packet destined for spoke B 140, via the connection with the hub site 120 through the multipoint tunnels 112, 113 over the IPv6 cloud 110. The transmitted first data packet may also be encrypted with a group cryptography key in which case, the receiving node may be configured to perform decryption using the group encryption key.

Upon receiving the first data packet, the hub site 120 may determine that the first data packet is received on the multipoint generic routing encapsulation (GRE) tunnel and going out the multipoint GRE tunnel. This helps the hub site 120 to determine that a shortcut may be available. In particular embodiments, the hub site 120 may forward the data packet from spoke A 130 over the IPv6 cloud 110 through the multipoint tunnels 112, 114 to spoke B 140, including an extension header that encodes the IPv4 tunnel and IPv6 addresses of spoke A 130. Upon receiving the data packet at spoke B 140, in particular embodiments, spoke B 140 decrypts and decapsulates the packet and forwards the packet as normal. Further, spoke B 140 may read and process the extension header including the IPv4 and IPv6 addresses of spoke A 130 and update its local binding information.

Thereafter, spoke B 140 may transmit a new null payload packet to spoke A 130 either directly using the new binding information, or via the hub site 120, including an extension header encoding the IPv4 tunnel address and IPv6 address of spoke B 140. The extension header may be inside the ESP encryption/authentication envelope and encrypted using the group key. Upon receiving and decrypting the new binding information encoded within the extension header sent from spoke B 140, spoke A 130 will update its own binding information, thus creating a direct connection tunnel 115 between spoke A 130 and spoke B 140 over the IPv6 cloud 110, without needing to send traffic via a hub site 120. In this manner, in particular embodiments, using the IPv6 functionalities, the previously required next hop resolution protocol (NHRP) is no longer needed in DMVPN for the next-hop resolution related to each spoke site network entity, device or router.

Referring still to FIG. 1, in particular embodiments, in the case where spoke A 130 has two or more computer terminals connected to it 131-132, spoke A 130 may advertise the IPv4 prefix reachability via BGP to the hub site 120, which in turn advertises to spoke B 140, such that spoke B 140 has knowledge of the IPv4 reachability of computer terminal 131 and computer terminal 132 through spoke A 130. Thus, in particular embodiments, spoke B 140 would make use of a single binding for the spoke A 130 (and not need a separate binding per each computer terminals 131, 132) to facilitate the communication between computer terminal 132 and computer terminal 141, once a direct tunnel is connected between spoke A 130, and spoke B 140 based on ongoing communication between computer terminal 131 and 141.

Figure 2:
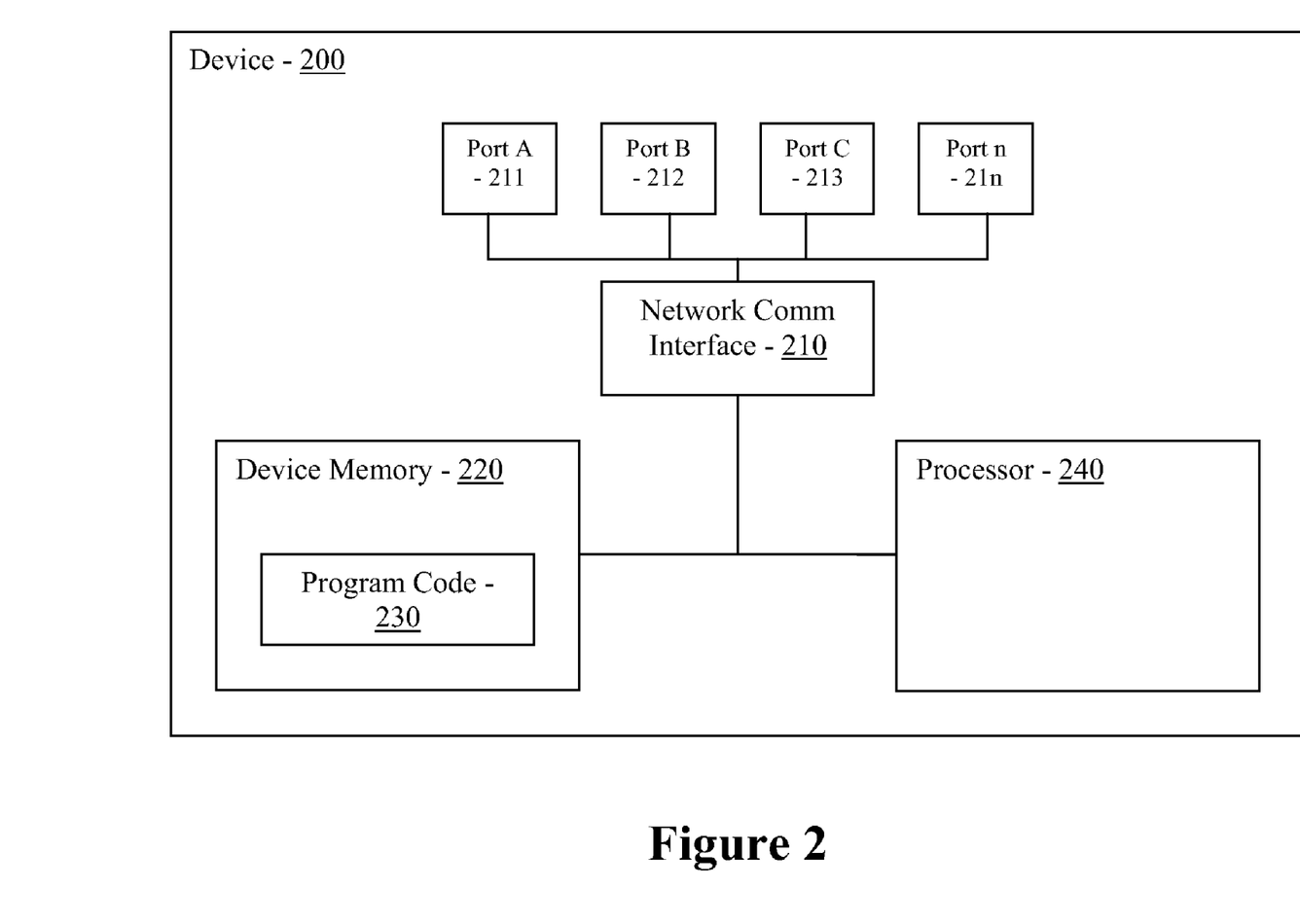
FIG. 2 is a representation of a routing apparatus device for practicing one or more embodiments of the present disclosure.

FIG. 2 is a representation of a routing apparatus device for practicing one or more embodiments of the present disclosure. In particular embodiments, the network device 200 includes a network communication interface 210 with one or more communication terminals 211-21n, coupled to one or more processors 240, which will execute a set of instructions 230 encoded onto a memory 220. The program code 230 encoded onto the memory 220 is a set of instructions that when executed by the one or more processors defines the above method of connecting an IPv4 DMVPN over an IPv6 network cloud 110. The network device may be configured for use as a router at spoke A 130, 140 on the DMVPN, or as a network device on the hub site 120.

Figure 3:
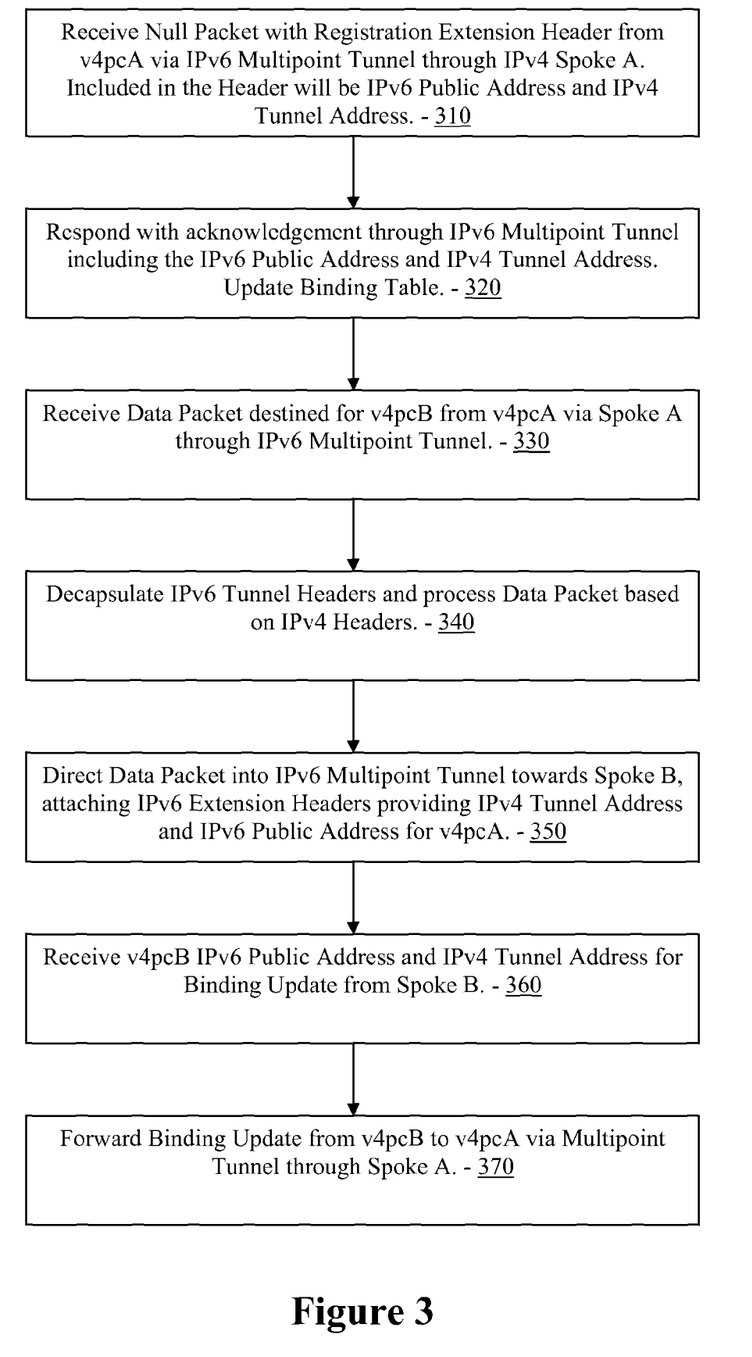
FIG. 3 is a flow chart illustrating the commands executed by the IPv4 based DMVPN hub site when connected to an IPv6 network cloud for one or more embodiments of the present disclosure.

FIG. 3 is a flow chart illustrating the commands executed by the IPv4 based DMVPN hub site when connected to an IPv6 network cloud for one or more embodiments of the present disclosure. To connect to spoke A 130, in particular embodiments, the hub site 120 receives a null packet from spoke A 130 that includes the encrypted registration extension header (310). This extension header 310 may be sent through the IPv6 multipoint tunnel over the IPv6 cloud, and includes the IPv4 tunnel address and IPv6 address of spoke A 130. The hub site 120 may decrypt the encapsulated extension headers using the group key, and then respond with an acknowledgment to spoke A 130 through the IPv6 multipoint tunnels, including an extension header, also encrypted with the group key, encoding the IPv6 tunnel source address and the IPv4 tunnel address of the hub site 120 (320). In particular embodiments, the hub site 120 may update the binding table with spoke A 130, to register spoke A 130 with the hub site 120 and establishing a connection.

Referring still to FIG. 3, in particular embodiments, in the case that spoke A 130 needs to send traffic to spoke B 140, spoke A 130 determines whether the binding entry for spoke B 140 already exists. If the binding entry for spoke B does not exist, then spoke A 130 sends the data through the hub site (330). Before a data packet can be sent towards spoke B 140 via the hub site 120, the binding between spoke A 1230 and the hub site 130 is updated by following the same routine described above to connect spoke A 130 and the hub site 120 (310-320). In particular embodiments, once the data packet is received from spoke A 130, the hub site 120 decrypts, if IPSec encryption was used, decapsulates the IPv6 headers, and processes the data packet based on the corresponding IPv4 headers (340).

In particular embodiments, upon determination that the data packet is destined for spoke B 140, the hub site 120 may direct the data packet over the IPv6 cloud 110 through the IPv6 multipoint tunnel, including extension headers providing the IPv4 tunnel address and IPv6 address of spoke A 130 (350). Upon receipt of the data packet from the hub site 120, spoke B 140 may send an acknowledgement including binding update information either directly to spoke A 130 or routed back through the hub site 120 (360). When data is sent back from spoke B 140 through the hub site 120, the hub site 120 may forward the data packet, including extension headers encoding the IPv4 tunnel and IPv6 addresses of spoke B 140 over the IPv6 cloud 110 to spoke A 130 (370). When the binding is updated between spoke A 130 and spoke B 140, a direct multipoint tunnel is established between the two spokes A, B 130, 140 and the data routing protocols are optimized to no longer require rerouting through the hub site 120 between the two spokes A, B 130, 140.

Figure 4:
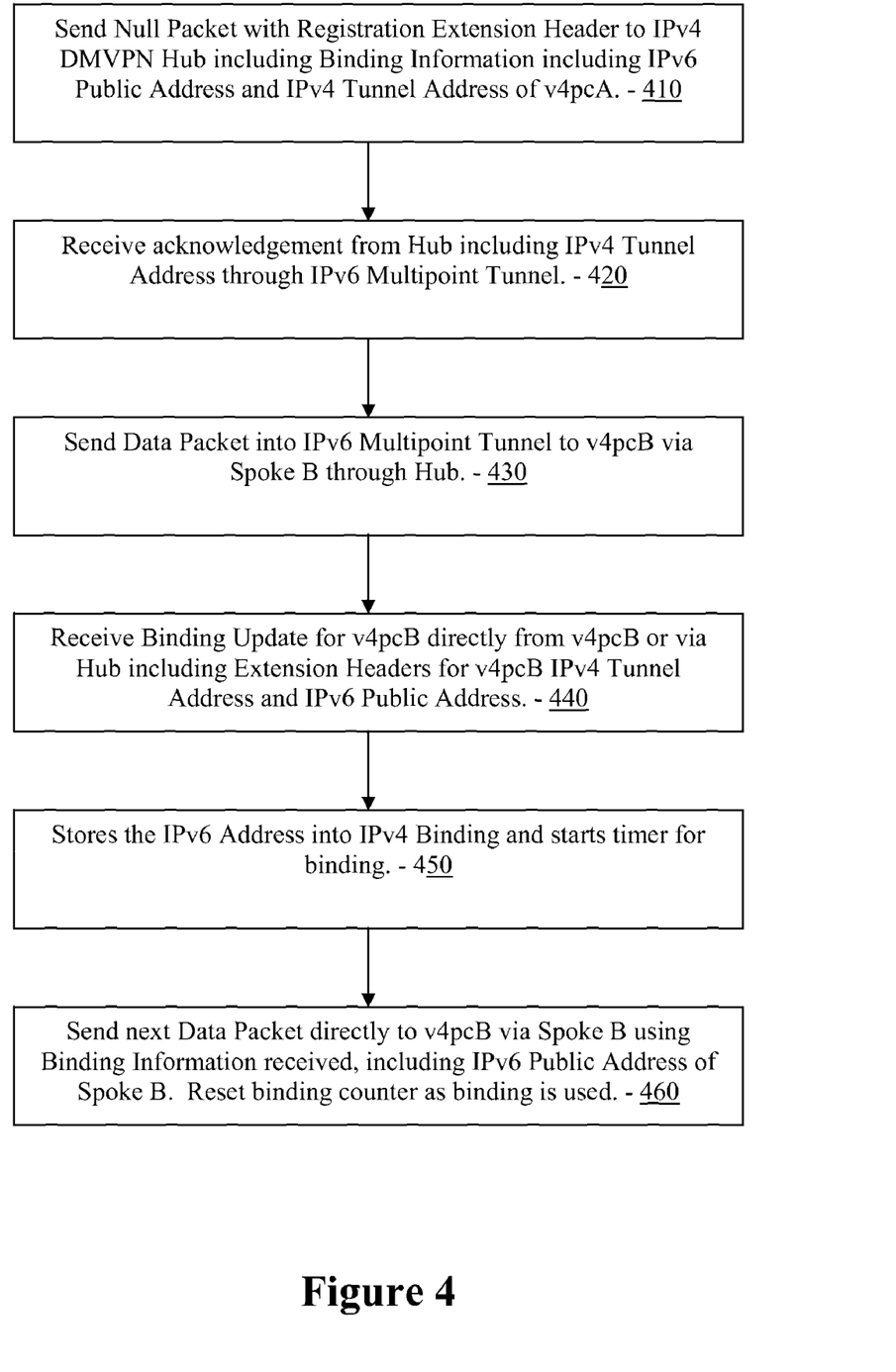
FIG. 4 is a flow chart illustrating the commands executed by the IPv4 based DMVPN spoke A when connected to an IPv6 network cloud for one or more embodiments of the present disclosure.

FIG. 4 is a flow chart illustrating the commands executed by the IPv4 based DMVPN spoke A when connected to an IPv6 network cloud for one or more embodiments of the present disclosure. Referring to FIGS. 1 and 4, in particular embodiments, to register with the hub site 120, spoke A 130 sends a null packet, optionally encrypted with the group cryptography key, with registration extension headers to the hub site 120 with binding information including the IPv4 tunnel address and IPv6 tunnel source address of spoke A 130 (410). Upon receipt of the acknowledgement from the hub site 120, including binding update information with the IPv4 tunnel address and IPv6 tunnel source address of the hub site 130, spoke A 130 may update its binding information, establishing a connection with the hub site 120 (420).

In particular embodiments, when spoke A 130 wants to send a data packet to spoke B 140, a connection between the spoke A 130 and spoke B is established by registering through the hub site 120. More specifically, in particular embodiments, once a connection has been made between spoke A 130 and the hub site 120, spoke A 130 may send a data packet destined for spoke B 140 over the IPv6 cloud 110, via the hub site 120 (430). After the hub site 120 forwards the data packet including the extension headers for spoke A 130 to spoke B 140, spoke A 130 awaits an acknowledgement from spoke B 140.

In particular embodiments, either directly, or via the hub site 120, spoke A 130 receives an acknowledgement of receipt from spoke B 140, including extension headers for spoke B 140 encoding the IPv4 tunnel address and IPv6 address of spoke B 140 (440). Spoke A 130 stores the binding information from spoke B 140 and a direct connection between the spokes is established and starts its binding timer for the direct connection between spoke A 130 and spoke 140 B (450). That is, in particular embodiments, each spoke is configured to maintain its binding timer and the state for its binding such that the binding may be locally maintained and when a binding lifetime is close to expiration but the binding is in use, a "binding refresh" may be sent out. Referring back to FIG. 4, spoke A 130 may then send data packets directly to spoke B 140 via the direct connection between spoke A 130 and spoke B 140, with the binding timer resetting as the binding is used (460).

Figure 5:
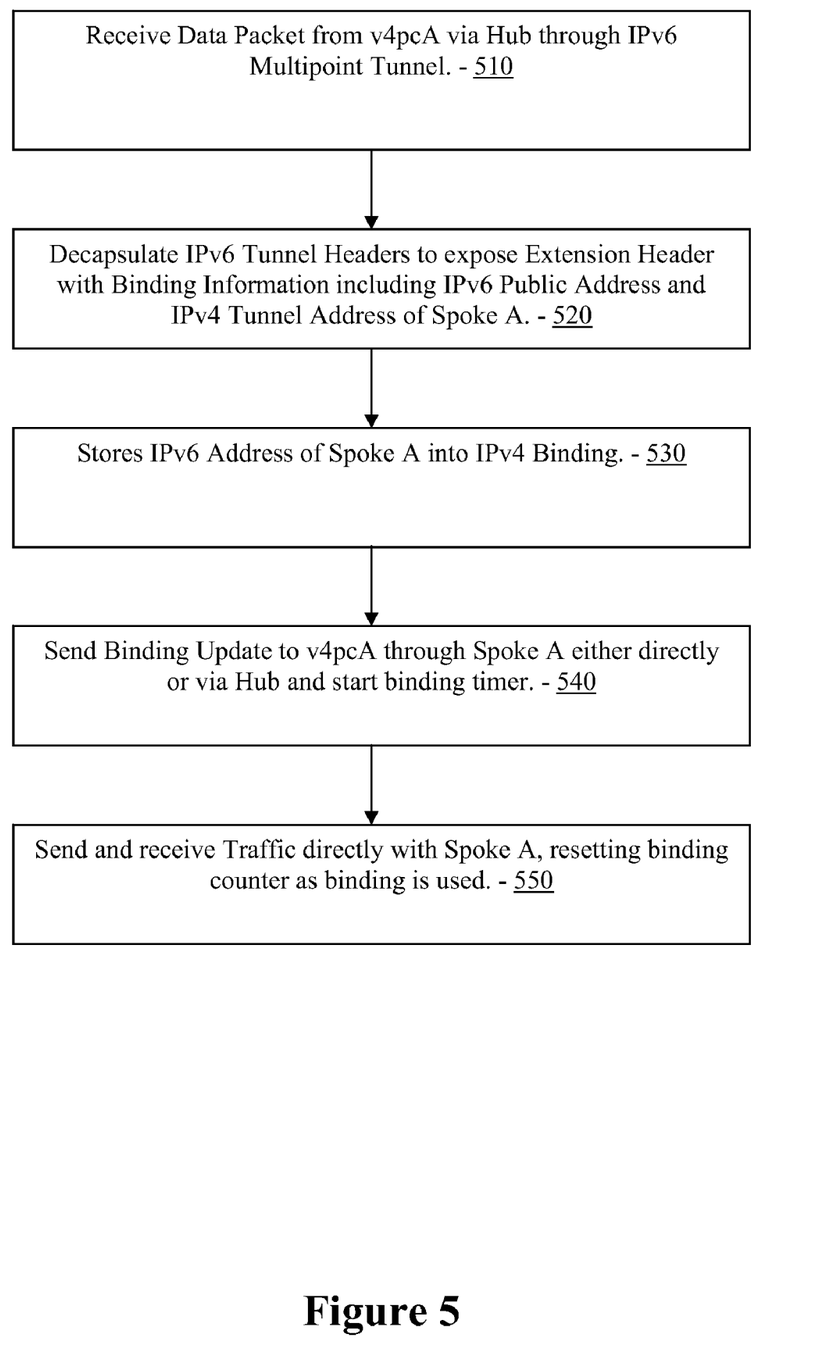
FIG. 5 is a flow chart illustrating the commands executed by the IPv4 based DMVPN spoke B when connected to an IPv6 network cloud for one or more embodiments of the present disclosure.

FIG. 5 is a flow chart illustrating the commands executed by the IPv4 based DMVPN spoke B when connected to an IPv6 network cloud for one or more embodiments of the present disclosure. In particular embodiments, once spoke A 130 is registered with the hub site 120, spoke A 130 may send an encrypted first data packet towards spoke B 140, via the hub site 120. Upon receipt of the data packet from spoke A 130 (510) via the hub site 120, spoke B 140 may decrypt the packet using the group key, and then decapsulate the IPv6 tunnel headers to expose the extension header with the binding information for spoke A 130, including the IPv4 tunnel and IPv6 addresses of spoke A 130 (520). In particular embodiments, spoke B 140 may store the IPv6 and IPv4 addresses into the binding update information and begins its binding timer (530).

Referring back to FIG. 5, an extension header including binding information with the IPv4 tunnel and IPv6 addresses of spoke B 140 may be sent to spoke A 130 either directly or rerouted via the hub site 120 (540). When spoke A 130 receives the binding information, a direct connection between spoke A 130 and spoke B 140 is established, allowing the transfer of traffic directly between spoke A 130 and spoke B 140, with the binding timer being reset as binding is used (550). The use of the group key allows for all traffic on this direct connection to be immediately encrypted and decrypted without the need for a PKI, thus improving the overall performance of the network.

In this manner, one embodiment of the present disclosure includes a framework for a Dynamic Multipoint Virtual Private Network (DMVPN) based on Internet Protocol version Four (IPv4) technology to connect through an Internet Protocol version Six (IPv6) network cloud. The particular embodiments may include the generation of new extension headers, encoding both an IPv4 tunnel address and a corresponding IPv6 address of a spoke or a hub site on the DMVPN. These extension headers are used to update the binding information tables of both communicating terminals such as DMVPN Hub and Spoke routers and allow for optimal communication path between the communicating terminals.

A method in particular embodiments includes establishing an Internet Protocol version Six (IPv6) multipoint tunnel with an IPv6 address as a tunnel source address and an Internet Protocol version Four (IPv4) as a tunnel address, between a first spoke router and a hub router, transmitting a binding information associated with the first spoke router by the hub router to the second spoke router, forwarding an IPv4 data packet from the first spoke router to the second spoke router over the IPv6 multipoint tunnel via the hub router, and establishing a direct communication path between the second spoke router and the first spoke router using the binding information associated with the first spoke router.

The multipoint tunnel may use Generic Routing Encapsulation (GRE).

The method in particular embodiments may include associating an IPv4 address with a corresponding IPv6 address to formulate the binding information.

In particular embodiments, the method may include generating an extension header to convey the first spoke router registration information to the hub router.

Further, the method in particular embodiments may include receiving by the hub router, a data packet encapsulating an extension header encoding registration information from the first spoke router, and updating the binding information from the extension header encapsulated within the received data packet.

The binding information may be transmitted from the second spoke router to the first spoke router directly without rerouting through the hub router.

A method in particular embodiments may include registering a first spoke router with a hub router, forwarding an Internet Protocol version Four (IPv4) data packet from the first spoke router to a second spoke router over an Internet Protocol version Six (IPv6) multipoint tunnel via the hub router, transmitting a binding information associated with the first spoke router from the hub router to the second spoke router, and establishing a direct communication path by the second spoke router with the first spoke router based on the received binding information.

The multipoint tunnel may be generated with an IPv6 address as a tunnel source address and an IPv4 address as a tunnel address, and further, where the multipoint tunnel may use Generic Routing Encapsulation (GRE).

The method in particular embodiments may include associating an IPv6 address with an IPv4 address to determine the binding information.

Moreover, in particular embodiments, registering the first spoke router to the hub router may include formulating a spoke registration extension header encoding a first spoke router registration information as tunnel source IPv6 address, transmitting a data packet encapsulating the formulated extension header to the hub router through the IPv6 multipoint tunnel, receiving by the hub router, a data packet encapsulating the extension header encoding registration information from the first spoke router, and updating the binding information database using the information from the extension header.

Additionally, forwarding the IPv4 data packet in particular embodiments may include receiving the IPv4 data packet by the first spoke router, where the destination is reachable through the second spoke router, determining a multipoint tunnel destination address of the IPv6 multipoint tunnel by retrieving in a binding information database an IPv4 address associated with the second spoke router, encapsulating the IPv4 data packet in IPv6, and transmitting the IPv6 encapsulated IPv4 data packet to the determined multipoint tunnel destination on the IPv6 multipoint tunnel.

Also, determining the multipoint tunnel destination address in particular embodiments may include using the hub router IPv6 address as the tunnel destination address, if the binding information database lookup provided a negative match, and using a remote spoke router IPv6 address as the tunnel destination address, if the binding information database lookup provided a positive match.

A method in particular embodiments may include receiving an Internet Protocol version Six (IPv6) encapsulated Internet Protocol version Four (IPv4) data packet from a first spoke router, decapsulating the received IPv6 encapsulated IPv4 data packet, determining whether the IPv4 destination is reachable through a second spoke router, retrieving a binding information associated with the first spoke router and encoding the retrieved binding information in an extension header, determining a multipoint tunnel destination address of a multipoint tunnel by retrieving the binding information associated with a second spoke router IPv4 address, and forwarding the IPv6 encapsulated IPv4 data packet with the extension header to the second spoke router.

A method in particular embodiments may include receiving an Internet Protocol version Six (IPv6) encapsulated Internet Protocol version Four (IPv4) data packet with an extension header associated with a first router from a hub router, decapsulating the received IPv6 encapsulated IPv4 data packet to parse the extension header, generating a binding entry in a binding information database based on parsed extension header, and generating an IPv6 data packet with the extension header encoding a second spoke router binding information to communicate information associated with direct data path to the first spoke router.

The second spoke router binding information in particular embodiments may be directly transmitted from the second spoke router to the first spoke router without being routed through the hub router.

The method may include starting a timer for the binding the first spoke router and the second spoke router, and further, resetting the timer when the second spoke router binding information is used.

An apparatus in particular embodiments may include a network communications interface, one or more processors coupled to the network communications interface, and a memory storing instructions which, when executed by the one or more processors, registers a first spoke router, forwards an Internet Protocol version Four (IPv4) data packet from the first spoke router to a second spoke router over an Internet Protocol version Six (IPv6) multipoint tunnel, transmits a binding information associated with the first spoke router to the second spoke router to establish a direct communication path by the second spoke router with the first spoke router based on the received binding information.

An apparatus in particular embodiments may include means for registering a first spoke router with a hub router, means for forwarding an Internet Protocol version Four (IPv4) data packet from the first spoke router to a second spoke router over an Internet Protocol version Six (IPv6) multipoint tunnel via the hub router, means for transmitting a binding information associated with the first spoke router from the hub router to the second spoke router, and means for establishing a direct communication path by the second spoke router with the first spoke router based on the received binding information.

In particular embodiments, the capabilities of IPv6 may be leveraged to optimize data communication between spokes on the DMVPN. This may be achieved in one aspect by initially forwarding the traffic from one Spoke site to another, including the new extension headers encoding both the IPv4 tunnel address and IPv6 address, through the hub site. Once both spokes have received the necessary binding information encapsulated within the extension headers, a direct communication path is formed between the two spokes, allowing for optimized traffic communication without the need to reroute through the hub site. By using the IPv6 concepts to optimize connection, a Next Hop Resolution Protocol (NHRP) is no longer needed for spoke-to-spoke communication in DMVPN.

In this manner, in particular embodiments, IPv6 capabilities may be leveraged to enhance the DMVPN architecture to provide functionalities in the IPv4 environment. Moreover, cryptography may be used to ensure data security, integrity and confidentiality. The use of group cryptography may allow for the entire Virtual Private Network (VPN) to use the same cryptographic keys, allowing for any-any cryptography communication within the network. This approach may increase the scalability and performance of the overall framework as with group keys, spoke-to-spoke communication can be immediately encrypted and decrypted without the need for an Internet Key Exchange (IKE). Additionally, a Public Key Infrastructure/Pre-Shared Key (PKI/PSK) approach which permits the use of unique Pair-Wise Keys between peers, for example, may be used.

What is claimed is:

1. A method, comprising:
    establishing, between a first spoke router and a hub router, an Internet Protocol version Six (IPv6) multipoint tunnel with an IPv6 address as a tunnel source address and an Internet Protocol version Four (IPv4) address as a tunnel address of the first spoke router;
    transmitting a binding information associated with the first spoke router by the hub router to a second spoke router;
    forwarding an IPv4 data packet from the first spoke router to the second spoke router over the IPv6 multipoint tunnel via the hub router; and
    establishing a direct communication path between the second spoke router and the first spoke router using the binding information associated with the first spoke router.

2. The method of claim 1 wherein the multipoint tunnel uses Generic Routing Encapsulation (GRE).

3. The method of claim 1 further including associating an IPv4 address with a corresponding IPv6 address to formulate the binding information.

4. The method of claim 1 further including generating an extension header to convey first spoke router registration information to the hub router.

5. The method of claim 1, further comprising:
    receiving by the hub router, a data packet encapsulating an extension header encoding registration information from the first spoke router; and
    updating the binding information from the extension header encapsulated within the received data packet.

6. The method of claim 1, wherein the binding information is transmitted from the second spoke router to the first spoke router directly without rerouting through the hub router.

7. A method, comprising:
    registering a first spoke router with a hub router;
    forwarding an Internet Protocol version Four (IPv4) data packet from the first spoke router to a second spoke router over an Internet Protocol version Six (IPv6) multipoint tunnel via the hub router;
    transmitting a binding information associated with the first spoke router from the hub router to the second spoke router; and
    establishing a direct communication path by the second spoke router with the first spoke router based on the received binding information.

8. The method of claim 7 wherein the multipoint tunnel is generated with an IPv6 address as a tunnel source address and an IPv4 address as a tunnel address.

9. The method of claim 8, wherein the multipoint tunnel uses Generic Routing Encapsulation (GRE).

10. The method of claim 7 further including associating an IPv6 address with an IPv4 address to determine the binding information.

11. The method of claim 7, wherein registering the first spoke router to the hub router includes:
    formulating a spoke registration extension header encoding a first spoke router registration information as tunnel source IPv6 address;
    transmitting a data packet encapsulating the formulated extension header to the hub router through the IPv6 multipoint tunnel;
    receiving by the hub router, a data packet encapsulating the extension header encoding registration information from the first spoke router; and
    updating the binding information database using the information from the extension header.

12. The method of claim 7, wherein forwarding the IPv4 data packet includes:
    receiving the IPv4 data packet by the first spoke router, where the destination is reachable through the second spoke router;
    determining a multipoint tunnel destination address of the IPv6 multipoint tunnel by retrieving in a binding information database an IPv4 address associated with the second spoke router;
    encapsulating the IPv4 data packet in IPv6; and
    transmitting the IPv6 encapsulated IPv4 data packet to the determined multipoint tunnel destination on the IPv6 multipoint tunnel.

13. The method of claim 12, wherein determining the multipoint tunnel destination address includes:
    using the hub router IPv6 address as the tunnel destination address, if the binding information database lookup provided a negative match; and
    using a remote spoke router IPv6 address as the tunnel destination address, if the binding information database lookup provided a positive match.

14. A method, comprising:
    receiving an Internet Protocol version Six (IPv6) encapsulated Internet Protocol version Four (IPv4) data packet from a first spoke router;
    decapsulating the received IPv6 encapsulated IPv4 data packet;
    determining whether the IPv4 destination is reachable through a second spoke router;
    retrieving a binding information associated with the first spoke router and encoding the retrieved binding information in an extension header;
    determining a multipoint tunnel destination address of a multipoint tunnel by retrieving the binding information associated with a second spoke router IPv4 address; and
    forwarding the IPv6 encapsulated IPv4 data packet with the extension header to the second spoke router.

15. A method, comprising:
    receiving an Internet Protocol version Six (IPv6) encapsulated Internet Protocol version Four (IPv4) data packet with an extension header associated with a first spoke router from a hub router;
    decapsulating the received IPv6 encapsulated IPv4 data packet to parse the extension header;
    generating a binding entry in a binding information database based on the parsed extension header; and
    generating an IPv6 data packet with the extension header encoding a second spoke router binding information to communicate information over a direct data path from the second spoke router to the first spoke router.

16. The method of claim 15, wherein the second spoke router binding information is directly transmitted from the second spoke router to the first spoke router without being routed through the hub router.

17. The method of claim 15, including starting a timer for the second spoke router binding information.

18. The method of claim 17 including resetting the timer when the second spoke router binding information is used.

19. An apparatus, comprising:
a network communications interface;
one or more processors coupled to the network communications interface; and
a memory storing instructions which, when executed by the one or more processors, registers a first spoke router, forwards an Internet Protocol version Four (IPv4) data packet from the first spoke router to a second spoke router over an Internet Protocol version Six (IPv6) multipoint tunnel, transmits a binding information associated with the first spoke router to the second spoke router to establish a direct communication path by the second spoke router with the first spoke router based on the received binding information.

20. An apparatus, comprising:
means for registering a first spoke router with a hub router;
means for forwarding an Internet Protocol version Four (IPv4) data packet from the first spoke router to a second spoke router over an Internet Protocol version Six (IPv6) multipoint tunnel via the hub router;
means for transmitting a binding information associated with the first spoke router from the hub router to the second spoke router; and
means for establishing a direct communication path by the second spoke router with the first spoke router based on the received binding information.

* * * * *